United States Patent Office 2,770,366
Patented Nov. 13, 1956

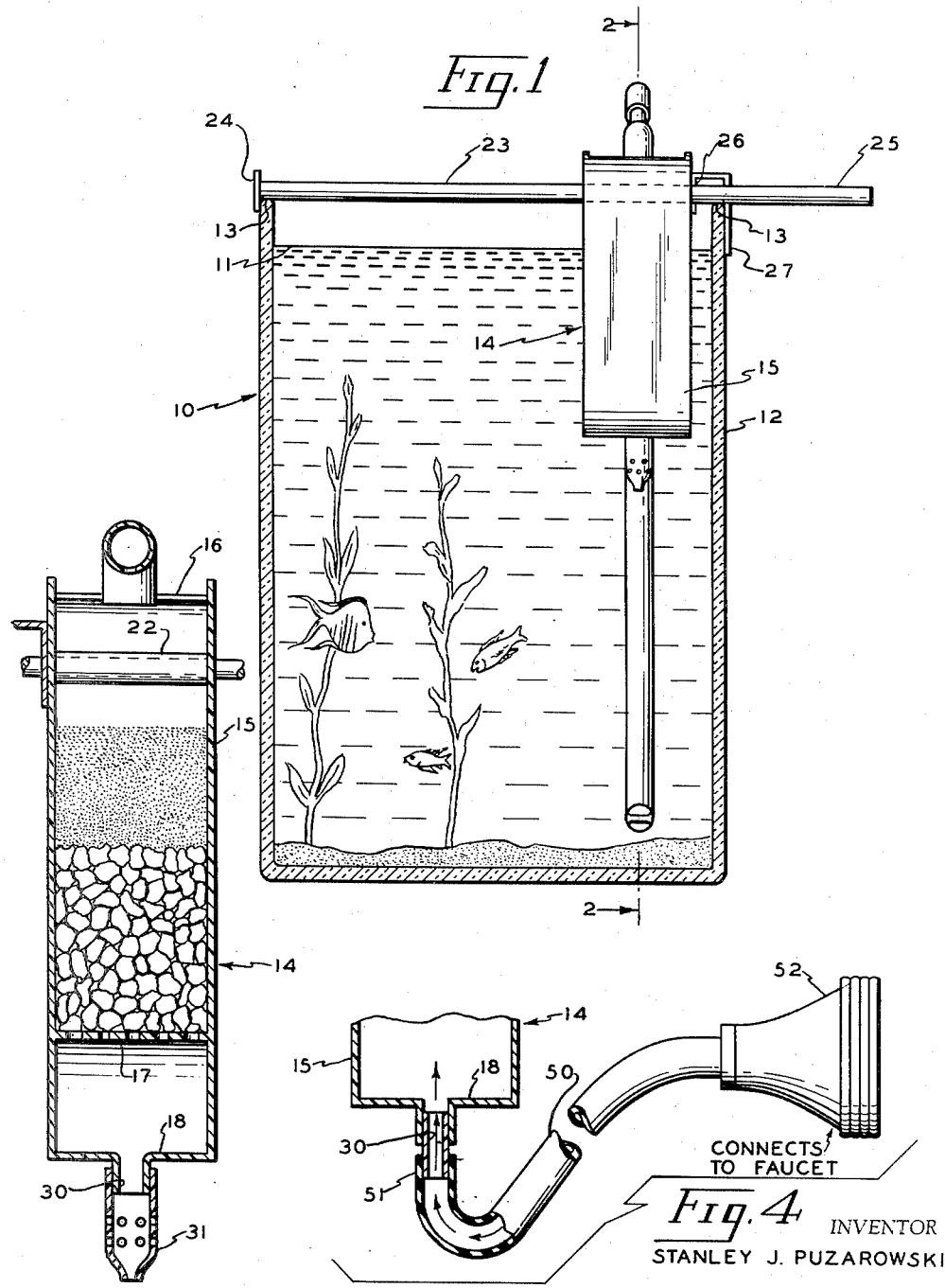

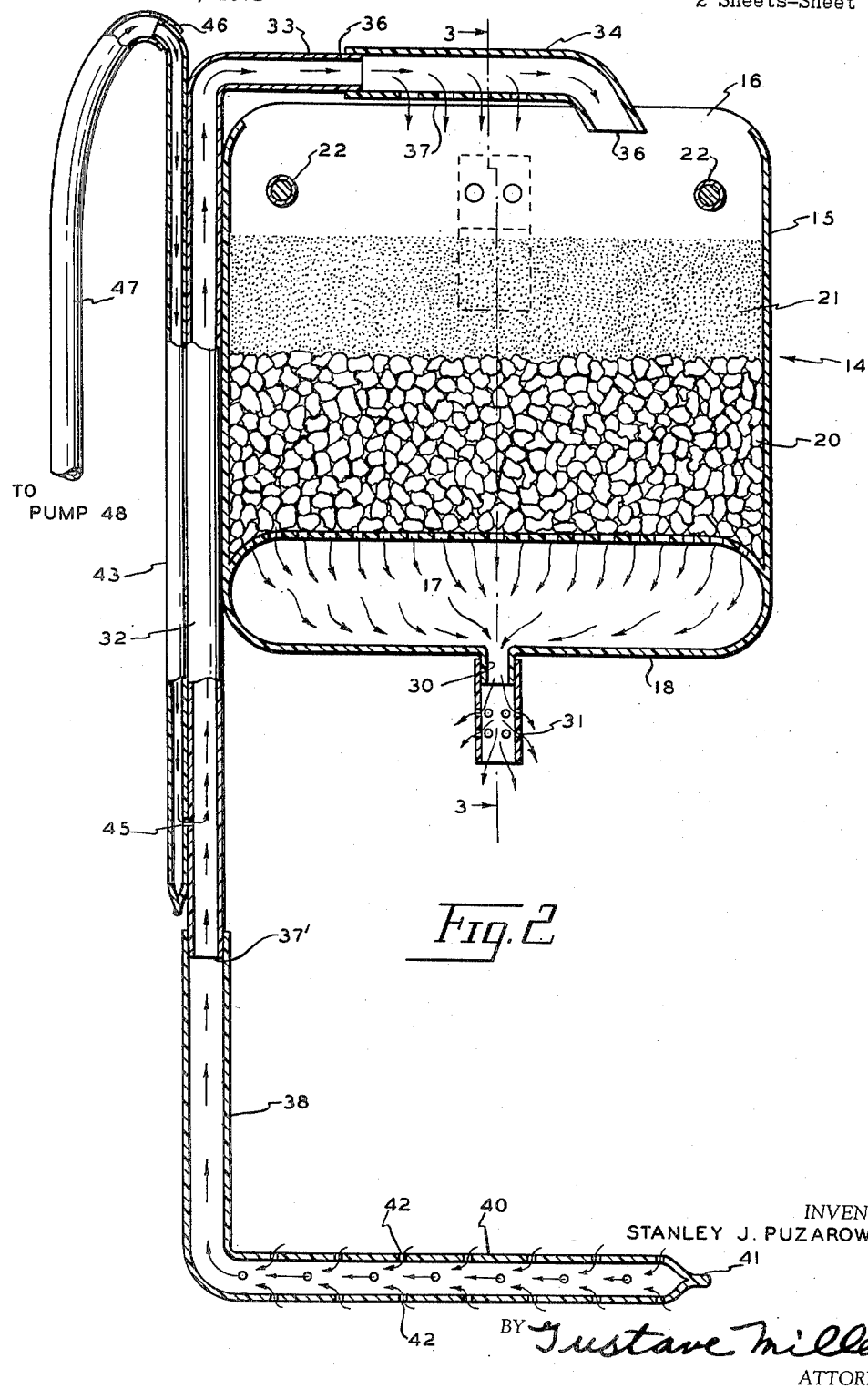

2,770,366

REVERSE FLOW CLEANABLE AQUARIUM FILTER

Stanley J. Puzarowski, Erie, Pa.; now by change of name to Stanley J. Prazer, assignor to Gustave Miller, Washington, D. C.

Application October 2, 1951, Serial No. 249,370

3 Claims. (Cl. 210—98)

This invention relates to a reverse flow cleanable aquarium filter and has for an object to provide a filter to be used inside a fish aquarium which may be easily and readily supportable on the top edges of the aquarium and used to continuously filter the water in the aquarium, making use of any conventional aeration source for the aquarium to cause a flow of the aquarium water through the filter, and which may be easily and readily removed from the aquarium for the purpose of washing out all accumulated waste or other foreign matter from the filtering medium by merely attaching a suitable connection to any suitable source of cleaning water such as a kitchen sink faucet and allowing the water from the faucet to flow through the filtering medium in a reverse direction to thoroughly clean the filter in a matter of a very few minutes, whereupon it may be easily and readily placed back in operative position.

A further object of this invention is to provide an aquarium filter which may be suspended in the water of an aquarium and connected to the aeration source for the aquarium so that the air from the aeration source acts as a pump to cause a flow of the aquarium water through the filter, simultaneously aerating such water and delivering the aerated water through the filter back to the aquarium.

A further object of this invention is to provide an aquarium filter wherein after the filter has accumulated waste and other foreign matter, it may be cleaned by means of the back washing principle, and the filtering medium need not be upset.

A further object of this invention is to provide an aquarium filter, wherein the filtering medium in the filter is cleaned by washing it with a stream of water flowing in a reverse direction therethrough without otherwise disturbing or upsetting the position of the filtering medium in the filter container, but merely by removing the filter container as a whole from the aquarium and then attaching it through a suitable hose to any water faucet for controllably directing a flow of water therethrough in the reverse direction to thoroughly clean the filtering medium.

Still a further object of this invention is to provide an aquarium filter wherein the filter container may be made of a suitable transparent plastic material making filtering medium contained therein visible at all times so that the accumulation of waste or foreign matter will be readily visible whereby the condition of the filtering medium will be visible at all times so that it may be cleaned whenever needed.

Still a further object of this invention is to provide an aquarium filter wherein the filtering medium includes an upper layer of fine material and a lower layer of heavy material, and wherein such materials may be gravel, carbon, glass wool or spun glass, bone charcoal or other suitable filtering materials, and wherein once such filtering mediums are put in position within the filter container, they may be cleaned at suitable intervals without the necessity of removing the filtering medium from the filter container.

With the foregoing and other objects in view, this invention comprises the combination, construction and arrangement of parts hereinafter set forth, claimed and disclosed in the accompanying drawings, wherein:

Fig. 1 is a sectional view across an aquarium showing the filter supported therein.

Fig. 2 is a sectional view on a larger scale on line 2—2 of Fig. 1, omitting the aquarium.

Fig. 3 is a sectional view on line 3—3 of Figure 2, and

Fig. 4 is a partly sectional and partly plan view showing a faucet connection for cleaning the filter.

There is shown at 10 a representation of a conventional fish aquarium having its water level at 11 and aquarium side walls 12 having their top edges at 13.

The aquarium filter 14 of this invention consists of a preferably transparent rectangular box-like member 15 having its top open at 16 and provided with a foraminated false bottom 17 spaced from its true bottom 18. The foraminated false bottom 17 is provided with a plurality of holes of fairly small size preferably ranging between three and four thirty-seconds of an inch. Arranged to be supported on the false bottom 17 is a heavy filtering medium 20 and above that is placed a second layer but of a fine filtering medium 21. Any suitable filtering medium may be used such as bone charcoal, carbon, spun glass or glass wool, gravel, or the like. Inasmuch as the container 15 is of a suitable transparent plastic, the filtering media 20 and 21 will be visible at all times, so that when foreign matter or waste have accumulated therein, such will be readily apparent, and the same may be easily cleaned as hereinafter described. If desired, a line may be scratched along the side of the container 15 showing suitable level for each layer of filtering media 20 and 21, but such is not essential. Extending through a pair of transversely aligned holes in the sides of the container 15 are a pair of sleeves 22 through which may be inserted a pair of aluminum supporting rods 23 of a length sufficient to rest on the edges 13 of the side walls 12 of the aquarium 10. At one end, the rods 23 may be provided with heads 24 so as to cooperate with the side of the front edge 13 of the aquarium 10, while the other ends 25 extend substantially beyond the rear wall of the aquarium thus insuring against accidental displacement of the supporting rods 23. A reverse J-shaped hanger of a suitable metal such as stainless steel, has its short end 26 on the rear side of the filter container 15 while its long end 27 extends over the outside of the rear wall of the aquarium 10 thereby positively positioning the filter adjacent the rear aquarium wall. The rods 23 thus serve to support the filter 14 with the filter container 15 having its open top 16 above the water level 11 while the filtering media 20 and 21 therein are at and below the water level.

The bottom wall 18 has an apertured port or spout 30 extending from the bottom thereof, and a foraminated cap 31 of a suitable diameter is slip fitted over the port or spout 30 so as to prevent the possibility of any small fish in the aquarium getting into the space between the filter bottom 18 and the false bottom 17.

In order to cause the water from the aquarium 10 to rise above its water level 11 and flow through the filtering media 20 and 21, there is provided an upwardly extending pipe 32 secured along one end of the container 15 and provided with a horizontal arm 33 extending over the open top 16 of the container 15. A flow pipe 34 slip fitted over the end horizontal arm 33 at 35 is provided with a downwardly turned end 36 and perforations 37 along its lower edge so that the water flowing therethrough will drop therefrom in a gentle spray. Slip fitted to the bottom end 37' of the upright pipe 32 is an angle pipe 38 having a horizontal arm 40 terminating in a closed end 41, and provided with a plurality of apertures 42 to permit the water to flow inwardly from the aquarium to the pipe 32. Secured along the upright pipe 32 is an air pipe 43 closed at its bottom and having a passage 45 leading from adjacent the bottom of the pipe 43 into the pipe 32 at a point substantially below container bottom wall 18. Slip fitted at 46 to the top of pipe 43 is a flexible plastic or rubber hose 47 whose other end is connected to the aeration source or pump 48 conventionally provided for aerating the water of the aquarium 10.

In operation, in order to filter the water of the aquarium 10, the end of the pipe 47 conducts air from the aeration source through the pipe 47 and pipe 43 and passage 45 into the pipe 32. The air through passage 45 tends to rise in the pipe 32 thus aerating the water in pipe 32 and decreasing its specific gravity whereupon it will be displaced by water coming in through apertures 42 in the lower horizontal arm 40 and will rise upwardly and through the horizontal arm 33 and out through apertures 37 and open end 36 of upper horizontal arm 34 through the open top 16 then through the filtering media 21 and 20 through the foraminated false bottom 17 out through the port or spout 30 and foraminated cap 31 and back into the aquarium in a gentle flow. The waste or foreign matter will be filtered out as the water passes through the filtering media 21 and 20 and be retained therein. When it is seen through the transparent sides of the container 15 that the filtering media 21 and 20 should be cleaned, the pipe 47 may be disconnected from the aeration pump 48, and the entire filter 14 may be removed from the aquarium by merely lifting it out thereof and carried to a sink or bathtub. Then, the perforated cap 31 is removed from the port or spout 30, and a hose 50 at its end 51 connected to the spout or port 30 while a faucet connection 52 at the other end is connected to the bathroom or sink faucet. Then, the faucet valve is slowly cracked upon and water will flow through the faucet connection 52 and pipe 50 through the spout or port 30 and up through the foraminated false bottom 17 through the filter media 20 and then 21 and out over the open top 16 to pick up and discharge all waste or foreign matter that has been collected in the filtering medium. If the filter had been neglected too long, and a crust has formed thereon, this may be easily broken up during the washing by means of a small probing rod, possibly using one of the supporting rods 23. The pressure of the water may be so regulated that the fine particles of the filtering medium will not be carried out with the waste. Due to the transparence of the filter, this can be readily seen and avoided. After the filtering medium is cleaned which generally does not take over one and one half minutes or less, the water pressure will be gradually reduced and cut off, whereupon the washing tube connection 50 may be removed, the foraminated cap 31 placed back in position, and the filter may be placed back in the aquarium and connected up to the aeration pump for continued indefinite use.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A reverse flow cleanable aquarium filter comprising a filtering medium container arranged to be suspended in an aquarium, said container comprising an open top member, a foraminated false bottom for supporting the filtering medium spaced from the bottom of said container, the container bottom having a port extending therethrough, means for removably suspending said container in the aquarium including an aquarium wall engaging hanger secured to one side of said container, a pipe secured vertically along one side of said container from below the bottom thereof and extending to discharge over the open top of said container an angle pipe rotatably mounted on the lower end of said vertical pipe, an air conduit connected to said vertical pipe adjacent its lower end and secured thereto, the other end of said air conduit being arranged to be connected to an aquarium aeration source to discharge into said vertical pipe and to cause aquarium water to flow from said pipe bottom end upwardly therethrough into the open top of said container, through the filtering medium therein, through the foraminated false bottom and said bottom port to the aquarium, said filtering medium container being readily removable from the aquarium, with said air conduit disconnected, said bottom port being arranged to be connected to a cleansing water supply to provide a reverse flow of cleansing water therethrough, through the foraminated false bottom, through the filtering medium supported thereon and out the open top to waste to thereby cleanse the filtering medium in position within the container.

2. A reverse flow cleanable aquarium filter comprising a filtering medium container arranged to be suspended in an aquarium, said container comprising a transparent open top rectangular member, a foraminated false bottom for supporting the filtering medium spaced from the bottom of said container, the container bottom having a port extending therethrough, means for removably suspending said container in the aquarium, a pipe secured vertically along one side of said container from below the bottom thereof and extending to discharge over the open top of said container, a closed end foraminated angle pipe rotatably mounted on the lower end of said vertical pipe, an air conduit connected to said vertical pipe adjacent its lower end and secured thereto, the other end of said air conduit being arranged to be connected to an aquarium aeration source to discharge into said vertical pipe and to cause aquarium water to flow from said pipe bottom end upwardly therethrough into the open top of said container, through the filtering medium therein, through said foraminated false bottom and said bottom port to the aquarium, said filtering medium container being readily removable from the aquarium, with said air conduit disconnected, said bottom port being arranged to be connected to a cleansing water supply to provide a reverse flow of cleansing water therethrough, through the foraminated false bottom, through the filtering medium supported thereon and out the open top to waste to thereby cleanse the filtering medium in position within the container.

3. A reverse flow cleanable aquarium filter comprising a filtering medium container arranged to be suspended in an aquarium, said container comprising a transparent open top rectangular member, a foraminated false bottom for supporting the filtering medium comprising a lower layer of heavy material and an upper layer of fine material spaced from the bottom of said container, the container bottom having a port extending therethrough, a perforated cap for said port, means for removably suspending said container in the aquarium comprising a pair of sleeves extending transversely through said container adjacent its top, rod means extending through said sleeves to rest on the top edges of the aquarium walls, and an aquarium wall engaging hanger secured to one side of said container, a pipe secured vertically along one side of said container from below the bottom thereof and extending to discharge over the open top of said container, a closed end angle pipe rotatably mounted on the lower end of said vertical pipe, the angle end of said angle pipe being foraminated, an air conduit connected to said vertical pipe adjacent its lower end and secured thereto, the other end of said air conduit being arranged to be connected to an aquarium aeration source to discharge into said vertical pipe and to cause aquarium water to flow from said pipe bottom end upwardly therethrough into the open top of said container through the filtering medium therein, through said foraminated false bottom and said bottom port and perforated cap to the aquarium, said filtering medium container being readily removable from the aquarium, with said air conduit disconnected, said bottom port being arranged to be connected to a cleansing water supply to provide a reverse flow of cleansing water therethrough, through the foraminated false bottom, through the filtering medium supported thereon and out the open top to waste to thereby cleanse the filtering medium in position within the container.

References Cited in the file of this patent

UNITED STATES PATENTS

| | | |
|---|---|---|
| 1,055,082 | Rogers | Mar. 4, 1913 |
| 2,049,530 | Van Eweyk | Aug. 4, 1936 |
| 2,265,741 | Morse | Dec. 9, 1941 |
| 2,293,051 | Duffy | Aug. 18, 1942 |
| 2,614,529 | Hausen | Oct. 21, 1952 |
| 2,665,250 | Willinger et al. | Jan. 5, 1954 |

FOREIGN PATENTS

| | | |
|---|---|---|
| 23,210 | Great Britain | 1893 |
| 6,591 | Great Britain | Mar. 30, 1895 |